March 7, 1967  C. M. FULTON  3,307,759
SKI CARRIER AND LOCKING DEVICE
Filed March 8, 1965  2 Sheets-Sheet 1
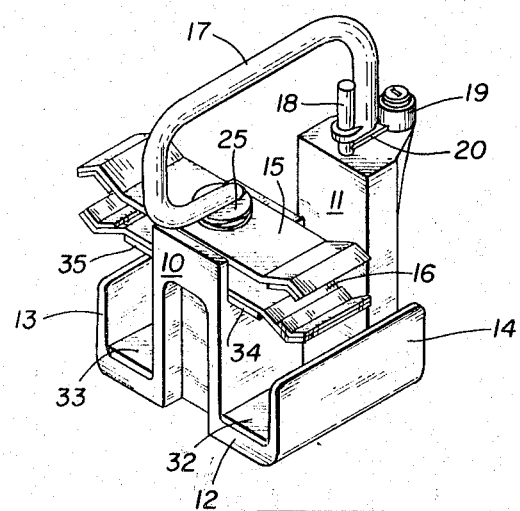
Fig. 1
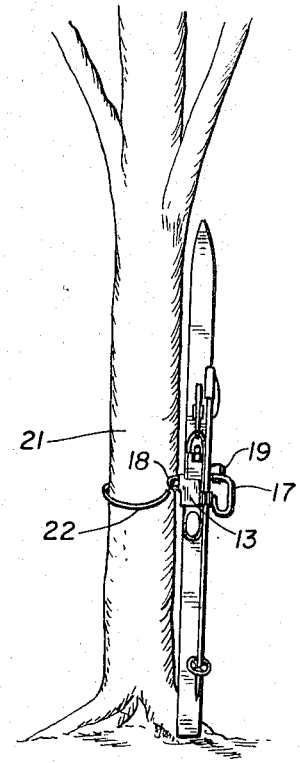
Fig. 2
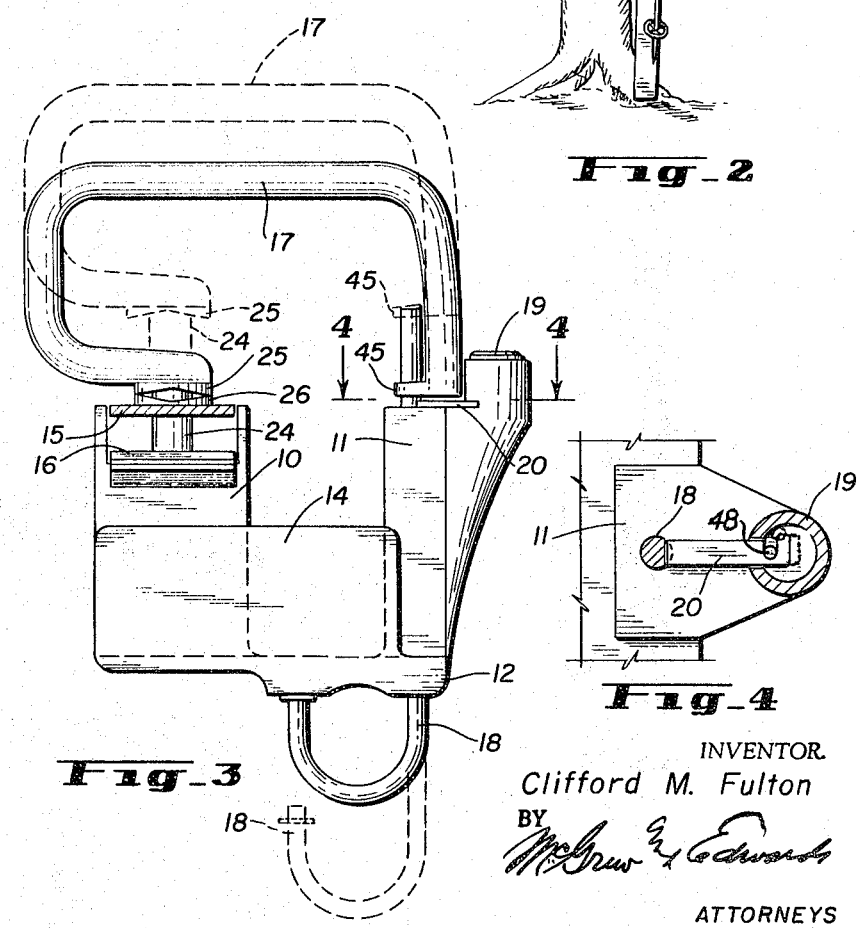
Fig. 3
Fig. 4
INVENTOR.
Clifford M. Fulton
BY
ATTORNEYS March 7, 1967 C. M. FULTON 3,307,759
SKI CARRIER AND LOCKING DEVICE
Filed March 8, 1965 2 Sheets-Sheet 2
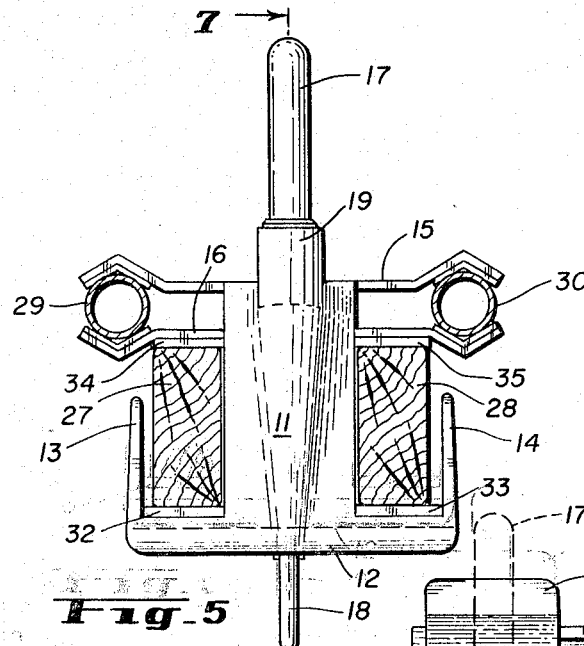
Fig_5
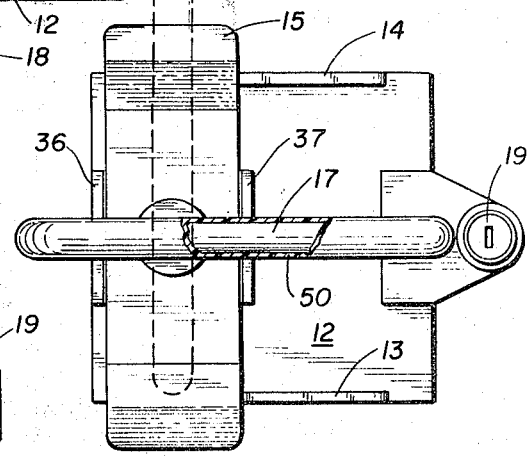
Fig_6
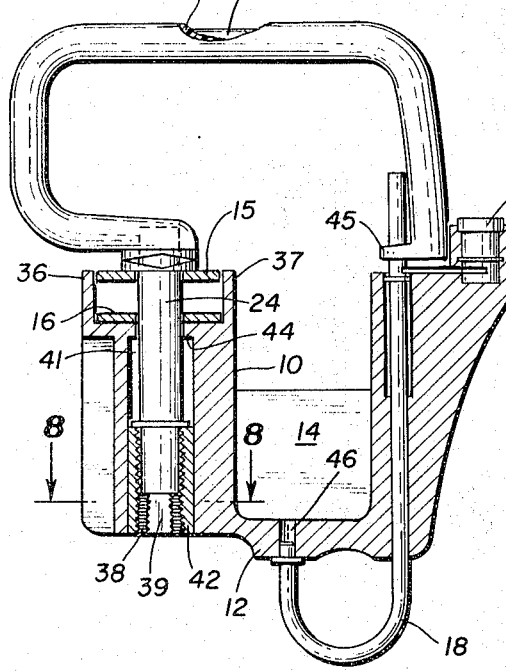
Fig_7
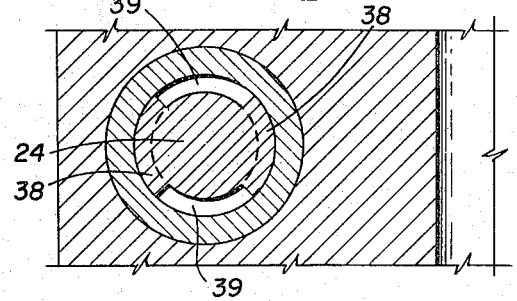
Fig_8
INVENTOR.
Clifford M. Fulton
BY
ATTORNEYS

United States Patent Office 3,307,759
Patented Mar. 7, 1967

3,307,759
SKI CARRIER AND LOCKING DEVICE
Clifford M. Fulton, Estes Park, Colo., assignor to Kleineider-Fulton Co., Estes Park, Colo., a corporation of Colorado
Filed Mar. 8, 1965, Ser. No. 437,911
11 Claims. (Cl. 224—45)

My invention relates to carriers for ski equipment and to locks for such equipment and particularly to an improved hand carrier for skis and a locking arrangement whereby the skis are locked in the carrier and the carrier may be locked to a pipe or other anchoring object.

Various arrangements have been provided heretofore for securing skis and ski poles together in a bundle suitable for carrying. Locking and checking facilities have also been provided at many ski resorts so that skis may be locked when not in use and unattended; coin operated locking devices have been provided for this purpose. Frequently, however, skiers wish to leave their skis unattended in locations where no locking facilities are available. Accordingly, it is an object of my invention to provide an improved locking device for skiing equipment.

It is another object of my invention to provide an improved hand carrier for skiing equipment.

It is another object of my invention to provide an improved carrier for skiing equipment including an arrangement for locking the skis in the carrier and the carrier to a stationary object.

Briefly, in carrying out the objects of my invention in one embodiment thereof, a hand carrier for a pair of skis and ski poles is constructed which comprises a rigid body made from strong light metal. The body is shaped to provide two pockets or recesses for insertion of the center portions of a pair of skis separated by a block which constitutes a camber retaining block for facilitating storage of the skis over long periods. A pivoted crossbar is provided to hold the skis in the pockets and a camming lever which also serves as the carrying handle is arranged to move from a position wherein the bar is free for pivotal and axial movement to a position which clamps the bar against the skis. A lock is provided on the block to securely lock the handle in its clamping position and prevent removal of the skis. The bar is constructed in two parts which are shaped to receive a pair of ski poles between them, the poles thus being locked securely on the carrier in the clamping position of the handle. The lock is of the padlock or shackle type and the shackle may be released to encircle a fixed object, such as a pipe, and then locked to anchor the carrier with the skis and poles locked therein. For locking where pipes or the like are not available, a cable or chain may be used and locked using the shackle in the same manner as that of conventional padlock.

The features of novelty which characterize my invention are pointed out with particularity in the claims annexed to and forming a part of this specification. My invention itself, however, both as to its organization and operation, together with further objects and advantages thereof, may best be understood upon reference to the following description taken in connection with the accompanying drawing in which:

FIG. 1 is a perspective view of a ski equipment carrier embodying the invention;

FIG. 2 is an elevation view illustrating skiing equipment attached to the carrier of FIG. 1;

FIG. 3 is an enlarged side elevation view of the carrier of FIG. 1;

FIG. 4 is an enlarged sectional view along the line 4—4 of FIG. 3;

FIG. 5 is a front elevation view of the carrier illustrating in section skis and ski poles secured therein;

FIG. 6 is a top plan view of the carrier;

FIG. 7 is a sectional side elevation view taken along the line 7—7 of FIG. 5 with the handle and lock shackle shown in full; and FIG. 8 is an enlarged sectional view taken along the line 8—8 of FIG. 7.

Referring now to the drawings, the carrier illustrated in FIG. 1 is constructed with a metal body comprising two upright block portions 10 and 11 secured to a base portion 12, the base being provided with upturned flanges or side members 13 and 14 which provide open topped pockets or recesses for receiving skis with their running faces in parallel relationship and engaging the blocks 10 and 11. The dimensions of the blocks 10 and 11 are selected so that they constitute a camber maintaining block for the skis. The skis are held in position by upper and lower clamping bars 15 and 16 pivotally mounted on the block 10 in a manner to be described.

A carrying handle 17 is rotatably secured on the block 10 and arranged to swing to and from its carrying position over the block 11 as shown; when locked in the carrying position the handle is engaged by the upper end of a lock shackle 18 and is secured so that it cannot rotate. A lock of the key operated type, indicated at 19, is provided in order to perform the locking functions of the carrier whereby the skis may be locked in the carrier and poles secured between the clamping bars 15 and 16 while at the same time the carrier may be locked to an external object such as a pipe or rack. The locking operation is effected by a slide or plunger 20 of the lock 19 which is moved into engagement with a slot in the side of the shackle 18 to prevent the shackle from being withdrawn. Further details of this locking arrangement and operation are described below.

The manner in which skis and poles are mounted in the carrier is indicated generally in FIG. 2 wherein a set of skis and poles are shown connected in the carrier and secured to a tree 21 by a chain or cable 22 which surrounds the tree and is locked to the carrier by the shackle 18 in a manner described below. It will be apparent that, when the skis and poles are locked in the carrier so that they cannot be removed therefrom without releasing the lock 19 and when the carrier is secured to a tree or other stationary object, the skiing equipment cannot be removed without unlocking the carrier unless the carrier is broken or destroyed; thus the skis may be left unattended with minimum likelihood of their being removed.

In order to minimize the likelihood of breakage or damage to the carrier, the parts are constructed of materials which effectively resist such damage. The blocks 10 and 11 and the base 12 are cast or otherwise made from a light strong metal such as a tough aluminum alloy, and the bars 15 and 16 and the lock shackle 18 are of steel or the like.

The details of construction of the carrier are shown in FIGS. 3 to 8, inclusive. As shown in FIGS. 3 and 7, the handle 17 is pivotally mounted on a cylindrical shaft 24 to which it is rigidly secured at the top thereof. Cam discs 25 and 26 are rigidly secured to the handle 17 and upper bar 15, respectively. These discs are alike and have high and low camming surfaces located ninety degrees apart so that a ninety-degree turn of the handle effects the full camming action. The cam discs are concentric with the shaft 24 and in the position shown in FIGS. 3 and 7 are in the clamping position of the handle wherein the high portions of both cams are in engagement and a strong camming force is applied downwardly against the bar 15 and thereby against ski poles placed between the bars and against skis placed in the pockets formed by the walls 13 and 14.

The portion of the bars when engaging the skis and poles is indicated in FIG. 5 where a pair of skis 27 and 28 are shown in the pockets and a pair of ski poles 29 and 30 between the bars 15 and 16. Pads of synthetic plastic or other suitable tough resilient material are provided in the bottoms of the ski pockets as indicated at 32 and 33 and similar pads are provided on the underside of the bar 16 as indicated at 34 and 35; these pads prevent injury to the skis while being sufficiently firm to prevent movement or dislodgment of the skis when the bar 16 has been clamped against them.

When the bars 15 and 16 are in their clamping position as shown in FIGS. 3 and 7, their rotation about the pivot bar 24 is prevented by ears 36 and 37 extending upwardly from the block 10 on either side of the bars. Thus when the handle 17 is in its clamping position the bars cannot be rotated to release the skis or poles.

The handle 17, as indicated above, is employed as a clamping lever for operating the cams to provide sufficient pressure on the bars 15 and 16 to secure the skis and poles against removal from the carrier body. In order that the clamping bars 15 and 16 may be adjusted easily to accommodate different sizes of skis and poles, the pivot bar 24 is arranged so that it may be secured within the block 10 in any desired position within a relatively wide range. Furthermore, the pivot bar is constructed so that it may be quickly released from its clamping position in engagement with the block. For this purpose the lower end of the bar 24 is provided with an interrupted thread connection having two opposite threaded segments 38, shown in FIGS. 7 and 8. These segments are separated by relieved threadless or smooth segments 39. The bar 24 is rotatably mounted in a bore 41 in the block 10 and the lower end of the bore is fitted with a bushing 42 which is provided with internal interrupted threads having threaded and plain segments complementary to the segments 38 and 39. The threads are shown as engaged in FIGS. 7 and 8 and, when the handle 17 is turned ninety degrees from the position in these figures, the threads lie in the interrupted or open segments and the rod 24 may be moved freely along its axis. The bushing 42 is rigidly secured in the block 10 by a press fit or in any other suitable manner and extends about one half the length of the bore 41. The top of the bushing provides a stop for engagement with a ring 43 rigidly secured to the bar and which limits its downward movement, the upper movement of the bar 24 being limited by a shoulder 44 at the top. The threaded portion of the bar 24 is sufficiently long to engage the threads in the bushing 42 when the bar 16 rests on the widest skis to be used with the carrier.

When skis and poles are to be mounted in the carrier, the lock is operated to release the bolt 19 from the shackle 18 and the shackle is pulled out to its dotted line position in FIG. 3. The handle 17 is then rotated to its ninety-degree dotted line position shown in FIG. 6 and the bars 15 and 16 are also rotated ninety degrees out of their position over the ski pockets, and skis and poles are then placed in their respective positions in the side pockets and between the bars. Thereupon the handle is pressed downwardly to urge the bars 15 and 16 against the poles and skis, and is then turned to engage the interrupted threads. Slight axial movement to effect the engagement of the threads in their nearest axial position may be required. The handle is then turned to its full line position of FIG. 6, which effects the clamping action of the cams 24 and 25 forcing the bar 15 downwardly against the poles and thereby forcing the bar 16 against the skis. The high and low surfaces of the cams 24 and 25 are ninety degrees apart so that a ninety-degree turn of the handle produces the full camming action and maximum clamping movement of the bars. The threads 38 are of relatively low pitch, but do provide a slight additional camming effect when the handle 17 is turned to its locking position.

After the bars have been clamped in the foregoing manner the shackle is returned to its full line position of FIGS. 3 and 7. On its return movement the long side of the shackle passes through an opening in a lug 45 formed at the end of the handle and locks the handle against rotation; the short end of the shackle is turned and guided into a hole 46 in the base 12, a ring 47 on the shackle limiting its position, the shackle construction thus being essentially that of a padlock. The lock 19 is then operated to rotate an eccentric pin 48, shown in FIG. 4, from its dotted line position to the full line position and move the bolt 20 into its slot in the long shank of the shackle. This locks both the shackle and the handle and secures the skis against removal from the carrier and the carrier against removal from an anchor to which it is attached by the shackle loop.

Because the carrier is intended to be used outdoors at low temperatures, the metal of the handle 17 is covered with a layer of insulating plastic material securely bonded to the metal as indicated at 50. This insulation reduces the rate of transfer of heat between the handle and the hand of the person holding it so that the likelihood of freezing to the handle is minimized.

While the invention has been described in connection with a specific construction of carrier and arrangement of the several parts thereof, various other modifications and arrangements will occur to those skilled in the art. Therefore it is not desired that the invention be limited to the specific details illustrated and described and it is intended by the appended claims to cover all modifications which fall within the spirit and scope of the invention.

I claim:

1. A hand carrier for skis comprising a rigid body having receiver means shaped to receive the central portions of a pair of skis, means movable into a position for clamping the skis securely in said receiver means to mount them firmly in said carrier, and a lock including a shackle having one side thereof slidably and pivotally mounted on said body, said shackle being movable by sliding and pivotal movement of said one side from a shackle open position to a shackle closed position for locking said carrier to an external object, said lock including a latching element movably mounted on said body for engagement with said shackle and having a locking member positioned to engage said clamping means when in its clamping position and when locked to prevent release of said clamping means while simultaneously locking said shackle in its closed position.

2. A hand carrier for skis comprising a rigid body having receiver means shaped to receive the central portions of a pair of skis, means movable into a position for clamping the skis securely in said receiver means to mount them firmly in said carrier, and a lock including a shackle mounted on said body and movable from a shackle open position to a shackle closed position for locking said carrier to an external object, said lock having a locking member positioned to engage said clamping means when in its clamping position and when locked to prevent release of said clamping means while simultaneously locking said shackle in its closed position, said clamping means including an operating lever movable between clamp and release position, and said shackle including a shank portion rotatably mounted in said body and movable axially from a shackle release position to a shackle locking position, said shank having a portion effective in said shackle locking position to engage said lever in its clamp position and to prevent movement of the lever from said clamp position, said shank having a locking recess and said locking means comprising a bolt movable into said recess for preventing axial movement of said shank.

3. A hand carrier for skies comprising a rigid body having pocket means for receiving the central portions of a pair of skis with their running faces in parallel relationship and with their adjacent edges exposed on one side, a bar pivotally attached to said body and movable into a position engaging the exposed adjacent edges of the skis, cam means for engaging said bar for pressing it against skis in said pocket means to clamp the skis securely in position on said body, said cam means being movable between a bar release position and a bar clamping position, and means including a lock of the shackle type for locking said carrier to an external object, said last mentioned means including means for engaging said cam means in its bar clamping position to lock said bar in its clamping position and prevent removal of skis from said pocket means whereby the operation of said lock effects simultaneously the locking of the skis in the carrier and the locking of the carrier to an external object.

4. A hand carrier for skis comprising a rigid body having pocket means for receiving the central portions of a pair of skis with their running faces in parallel relationship and with their adjacent edges exposed on one side, a bar pivotally attached to said body and movable into a position engaging said adjacent edges, cam means including an operating lever for engaging said bar and pressing the skis securely into position on said body, said lever being movable between a bar release position and a bar clamping position, and means engaging a portion of said lever remote from said bar for locking said lever to said block in said clamping position whereby the skis are locked to said carrier.

5. A hand carrier for skis comprising a rigid body having pocket means for receiving the central portions of a pair of skis with their running faces in parallel relationship and with their adjacent edges exposed on one side, a bar pivotally attached to said body and movable into a position engaging said adjacent edges, cam means including an operating lever for engaging said edges and pressing the skis securely into position on said body, said lever being movable between a bar release position and a bar clamping position, and means including a lock having a shackle for simultaneously locking said lever to said block securely in said clamping position and said block to an external object.

6. A hand carrier for skis comprising a rigid body having pocket means for receiving the central portions of a pair of skis with their running faces in parallel relationship and with their adjacent edges exposed on one side, a pair of compression bars centrally pivoted together on said block and movable axially of their pivot with respect to one another, said bars having ends formed to receive ski poles therebetween and being movable into position for engagement of one of said bars with the edges of the skis whereby poles secured between said bars will lie parallel to the skis, cam means including a lever for pressing said bars securely together and against the skis, said lever being movable between a bar release position and a bar clamping position, and means engaging said lever remote from said bars for locking said lever to said block in said clamping position whereby the skis and poles are securely locked in said carrier.

7. A hand carrier for skis comprising a rigid body having pocket means for receiving the central portions of a pair of skis with their running faces in parallel relationship and with their adjacent edges exposed on one side, a bar pivotally attached to said body and movable into a position engaging said adjacent edges, cam means including an operating lever for engaging said edges and pressing the skis securely into position on said body, said lever being movable between a bar release position and a bar clamping position, means engaging a portion of said lever remote from said bar for locking said lever to said block in said clamping position whereby the skis are locked to said carrier, and stop means on said block for preventing pivotal movement of said bar when said lever is in its clamping position.

8. A hand carrier for skis comprising a body portion having ski receiving and positioning means thereon, clamping means for holding a pair of skis securely on said body portion in said receiving means, said clamping means including an operating handle movable between release and clamping positions, and a lock for preventing movement of said handle from its clamping position whereby skis are securely locked to said body, said handle having a bail-shaped configuration and constituting a carrying handle for said carrier when in said locked position.

9. A hand carrier for skis comprising a body portion having ski receiving and positioning means thereon, clamping means for holding a pair of skis securely on said body portion in said receiving means, clamping means for holding a pair of ski poles in fixed position with respect to skis in said receiving means, and means including a single operating handle movable between first and second positions for simultaneously actuating both said clamping means to secure both the skis and the poles firmly on the carrier, and means for locking said handle to said carrier body in said clamping position, said handle having a bail configuration whereby it constitutes a gripping handle for the carrier.

10. A hand carrier for skis comprising a rigid body having pocket means for receiving the central portions of a pair of skis with their running faces in parallel relationship and with their adjacent edges exposed on one side, a bar pivotally attached to said body and movable into a position engaging the exposed adjacent edges of the skis, cam means for engaging said bar for pressing it against skis in said pocket means to clamp the skis securely in position on said body, said cam means being movable between a bar release position and a bar clamping position, and means including a lock of the shackle type for locking said carrier to an external object, said last mentioned means including means for engaging said cam means in its bar clamping position to lock said bar in its clamping position and prevent removal of skis from said pocket means whereby the operation of said lock effects simultaneously the locking of the skis in the carrier and the locking of the carrier to an external object, said locking means including a shackle releasable from a position in said block to encircle a pipe or similar structure and being moved back into position on said block upon locking of said handle whereby skis are securely locked in said carrier and said carrier to an external object simultaneously.

11. In combination, a ski carrier and a lock for holding the skis in a secure bundle and for preventing the removal of skis therefrom comprising a rigid block for holding a pair of skis spaced from one another in camber retaining position, retaining members rigidly secured to said block near the bottom thereof and spaced from the respective sides of the block a distance slightly greater than the central thickness of a ski to provide supports for receiving the skis one on each side of said block, a crossbar mounted on said block and extending laterally across the top of said block for engagement with the edges of skis positioned in said supports, means for urging said bar securely against the skis in said supports for clamping the skis firmly in position on said carrier and for preventing their displacement therefrom, said last mentioned means including a carrying handle movable between bar release and bar clamping positions, and means for locking said handle in its bar clamping position.

References Cited by the Examiner
UNITED STATES PATENTS

| 2,956,813 | 10/1960 | Madden | 244—45 X |
| 3,091,011 | 5/1963 | Campbell | 224—45 X |
| 3,114,487 | 12/1963 | Miller | 224—45 X |
| 3,209,970 | 10/1965 | Canell | 280—11.37 X |

HUGO O. SCHULZ, *Primary Examiner.*